(12) United States Patent
Lo et al.

(10) Patent No.: US 7,304,837 B2
(45) Date of Patent: Dec. 4, 2007

(54) HOUSING FOR A LIQUID CRYSTAL DISPLAY MODULE

(75) Inventors: Chi-Chung Lo, Chang Hua Hsien (TW); Li-Hui Chen, Hsinchu (TW)

(73) Assignee: AU Optronics Corp., Hsinchu 300 (TW)

( * ) Notice: Subject to any disclaimer, the term of this patent is extended or adjusted under 35 U.S.C. 154(b) by 335 days.

(21) Appl. No.: 11/099,633

(22) Filed: Apr. 6, 2005

(65) Prior Publication Data
US 2006/0034041 A1 Feb. 16, 2006

(30) Foreign Application Priority Data
Aug. 10, 2004 (TW) .............................. 93212700 U

(51) Int. Cl.
*G06F 1/16* (2006.01)
(52) U.S. Cl. ...................... 361/681; 248/917; 248/313; 349/58
(58) Field of Classification Search ................. 361/681
See application file for complete search history.

(56) References Cited

U.S. PATENT DOCUMENTS

| 6,144,552 | A | * | 11/2000 | Whitcher et al. | 361/681 |
| 6,151,207 | A | * | 11/2000 | Kim | 361/681 |
| 6,532,152 | B1 | * | 3/2003 | White et al. | 361/681 |
| 6,560,092 | B2 | * | 5/2003 | Itou et al. | 361/681 |
| 2002/0154474 | A1 | * | 10/2002 | Merz et al. | 361/681 |
| 2002/0159000 | A1 | * | 10/2002 | Ju | 349/58 |
| 2003/0046849 | A1 | * | 3/2003 | Lin | 40/792 |

* cited by examiner

Primary Examiner—Lisa Lea-Edmonds
(74) Attorney, Agent, or Firm—Troxell Law Office, PLLC

(57) ABSTRACT

A housing for a liquid crystal display module includes an upper housing, a lower housing and at least one shock absorber. The lower housing has one-stage inner sidewalls to define a top room and a bottom room for accommodating a liquid crystal display panel and a backlight module respectively. The at least one shock absorber on a top surface of the one-stage inner sidewalls has an inclined elastic protrusion with a free end for elastically supporting the liquid crystal display panel when the lower housing is assembled with the upper housing.

11 Claims, 5 Drawing Sheets

HOUSING FOR A LIQUID CRYSTAL DISPLAY MODULE

BACKGROUND OF THE INVENTION (1) Field of the Invention

The invention relates to a housing for a liquid crystal display module (LCM), and more particularly to a housing that can secure a liquid crystal display panel firmly to prevent undesirable vibration.

(2) Description of the Related Arts

Referring now to FIG. 1, a conventional LCM 100 includes an upper housing 120, a lower housing 130, an LCD panel 150, and a backlight module 140. The LCD panel 150 is stacked on the backlight module 140 as illustrated in FIG. 1.

It is well known that the LCD panel 150 is designed to be secured inside the lower housing 130 but leaving enough room for the convenience of assembling the LCM 100. Referring to FIGS. 2A, 2B and 2C, the conventional structure provides a plurality of dent-in leaf springs 132 along the side walls of the lower housing 130 to be elastically deflected outwards by the LCD panel 150 while in assembly. Based on the design as illustrated in FIG. 2A, force F1 resulted from the deformation of the leaf spring 132 can form clamping forces to firmly retain the LCD panel 150 inside the lower housing 130.

However, the aforesaid housing structure has the following disadvantages:

1. As illustrated in FIGS. 2B and 2C, while the LCD panel 150 is positioned in the lower housing 130, the friction between the sidewall of the LCD panel 150 and the leaf springs 132 may leave some scrapings on the surface of the backlight module 140 and thus cause undesirable results.

2. Moreover, when the LCD panel 150 is mounted to the lower housing 130 as shown in FIGS. 2B and 2C, improper handling of the LCD panel 150 may damage the LCD panel 150 or break the leaf springs 132.

3. As shown in FIG. 2C, the leaf springs 132 can only provide lateral force to the LCD panel 150. It cannot prevent the vertical vibration of the LCD panel 150.

Another approach, as shown in FIGS. 3A and 3B, provides a plurality of protrusive ribs 134 on the inner surface of the side walls of the lower housing 130 so as to slide and mount the LCD panel 150 into the lower housing 130. The protrusive ribs 134 can secure the LCD panel 150 tightly in the LCD panel 150 and prevent it from vertical or horizontal vibration.

However, this approach still has some drawbacks. As shown in FIGS. 3A and 3B, the protrusive ribs 134 can be easily scraped and damaged by the LCD panel 150 when being pushed into the housing. When applying this approach to hold the LCD panel 150 firmly in position, the size of the lower housing 130 and the protrusive ribs 134 must be precisely measured to ensure that the protrusive ribs 134 provide enough lateral forces for securing the LCD panel 150 without creating assembly difficulty.

Hence, there are still problems remained to be resolved in the conventional techniques for mounting the LCD panel.

SUMMARY OF THE INVENTION

Accordingly, it is an object of the present invention to provide an improved housing structure of a liquid crystal display module (LCM) to prevent an LCD panel from any vibration inside the LCM when external vibration or shock is applied to the liquid crystal display.

In accordance with the present invention, the invention includes an upper housing, and a lower housing configured with the upper housing. The lower housing has one-stage inner sidewalls creating a top room and a bottom room for enclosing a liquid crystal display panel stacked on a backlight module. At least one shock absorber on a top surface of the one-stage inner sidewalls. The shock absorber has an inclined elastic protrusion with a free end for elastically supporting the liquid crystal display panel when the assembled with the upper housing.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 4:
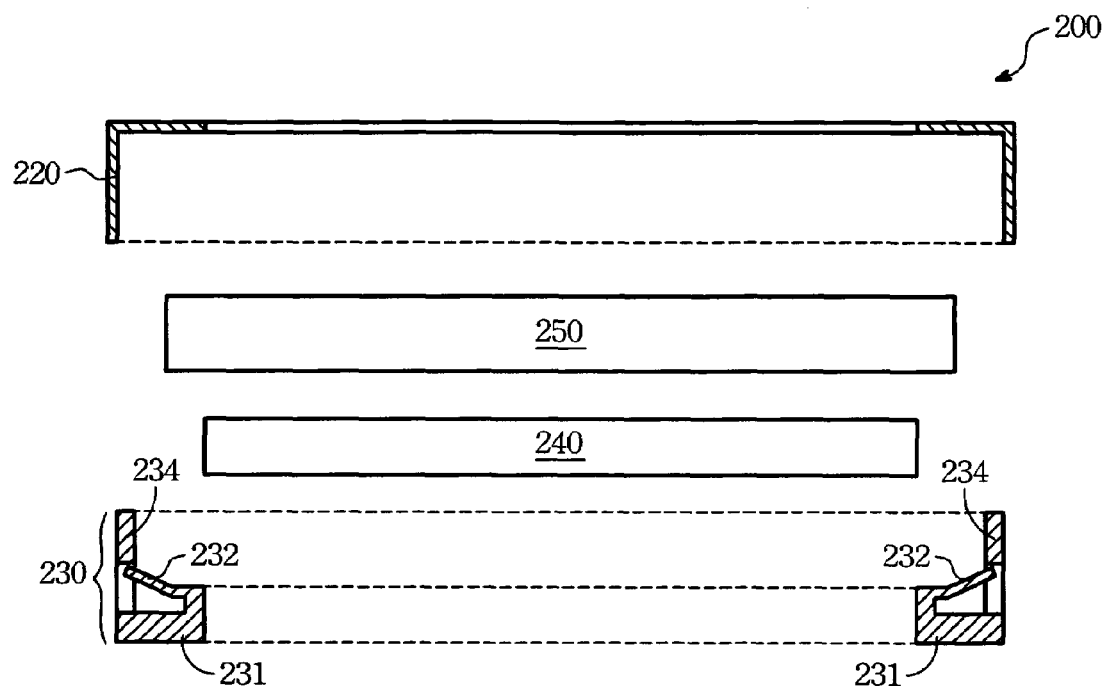
FIG. 4 is an exploded view of a preferred embodiment of the invention.

Refer now to FIG. 4 for showing a preferred embodiment of the invention. The LCM 200 includes an upper housing 220, a lower housing 230 configured with the upper housing 220, an LCD panel 250 and a backlight module 240.

As shown, the lower housing 230 has one-stage inner sidewalls 231. The inner sidewalls 231 create a top room and a bottom room in the lower housing 230 for accommodating the LCD panel 250 and the backlight module 240 respectively.

Figure 5:
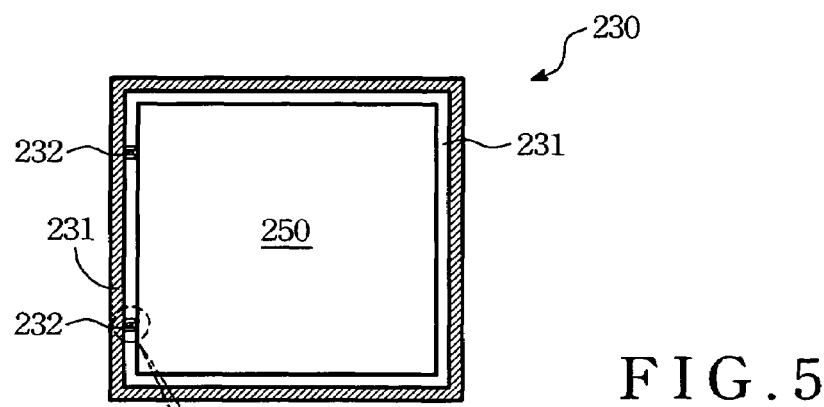
FIG. 5 is a top view of the preferred embodiment of the housing of FIG. 4.
Figure 7A:
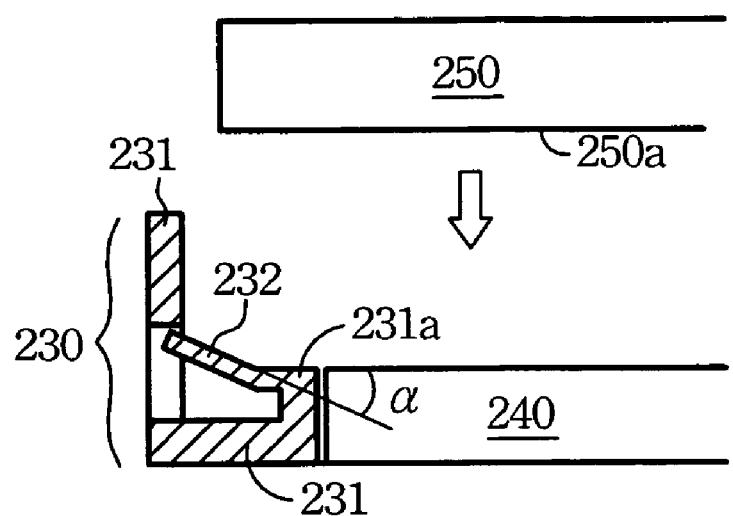
FIGS. 7A and 7B are schematic diagrams showing the shock absorber of the invention when assembled with an LCD panel.
Figure 7B:
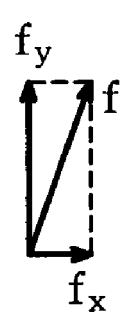
Figure 7B:
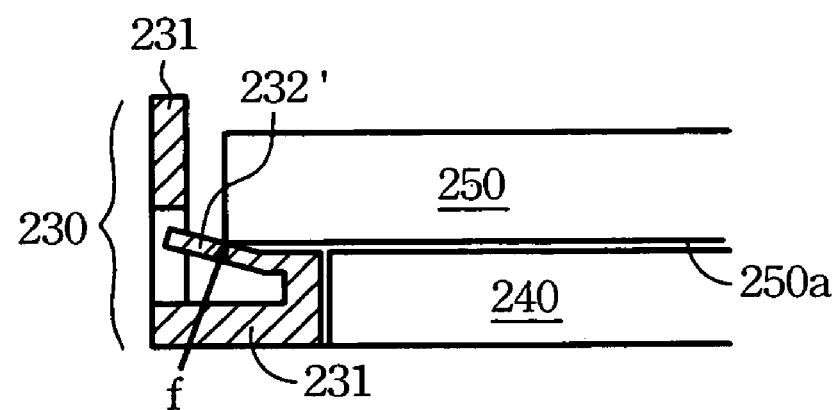

Also referring to FIG. 5, two separate shock absorbers 232 are arranged on a top room of the inner sidewall 231 of the lower housing 230. When the LCD panel 250 is mounted in the lower housing 230, the two shock absorbers 232 can elastically support the LCD panel 250 from its bottom surface 250a when positioned at the lower housing 230, as illustrated in FIGS. 7A and 7B. The elastic forces generated by the shock absorbers 232 can lift the LCD panel 250 upwards to be tightly enclosed by the upper housing 220 when the upper housing 220 and the lower housing 230 are assembled in position.

Figure 6:
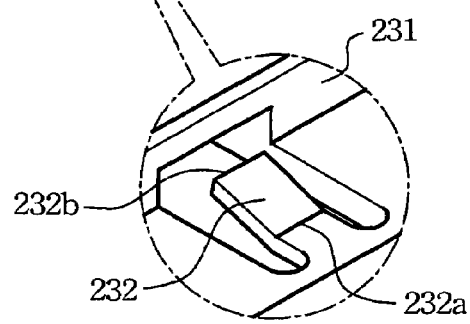
FIG. 6 is an enlarged view showing the structure of the shock absorber according to a preferred embodiment of the present invention.

Referring now to FIG. 6, the shock absorber 232 has an inclined elastic protrusion 232a with a free end 232b for elastically supporting the liquid crystal display panel when the lower housing 230 assembled with the upper housing 220. The inclined elastic protrusion 232a extends from the top surface of the one-stage inner sidewalls 231. Eventually, when the LCD panel 250 is mounted in the lower housing 230, the shock absorber 232 can prevent the LCD panel 250 from undesirable vibration when an external force or shock is applied to the LCD panel 250.

Refer now to FIGS. 7A and 7B for an embodiment of the shock absorber 232 to hold the LCD panel 250. When the LCD panel 250 is placed in the lower housing 230 and stacked on the backlight module 240, the edge of the lower surface 250a of the LCD panel 250 will push the shock absorber 232 downwards to the recession portion under the shock absorber 232. The depressed shock absorber 232' can then contribute a normal force f to act against the LCD panel 250. As shown in a separate sub-plot of FIG. 7B, the reaction force f can be realized in a 3-D wise into a force fz (not shown in the drawings) piecing perpendicular into the paper of FIG. 7B, a vertical upward force fy perpendicular to the lower surface 250a of the LCD panel 250, and a horizontal leftward force fx parallel to the lower surface 250a of the LCD panel 250. By providing the fy and the fx, the LCD panel 250 can be elastically pushed to tighten onto the upper housing (not shown in the drawings) so as to have the LCD panel 250 to space from the side wall 231.

It is noted that in order to provide an sufficient horizontal action force fx to push the LCD panel 250 away the side wall 231 in the lower housing 230, the shock absorber 232 is designed to form an inclined angle α ranging between 10 and 45 degrees with respect to the top surface 231a of the sidewalls 231. Also, the size of the shock absorber 232 should be properly made to allow the shock absorber 232 strong enough to support the LCD panel 250 and precisely measured to avoid scrapings generated due to friction. Yet, the design of the size of the shock absorber 232 depends on practical application.

Figure 8:
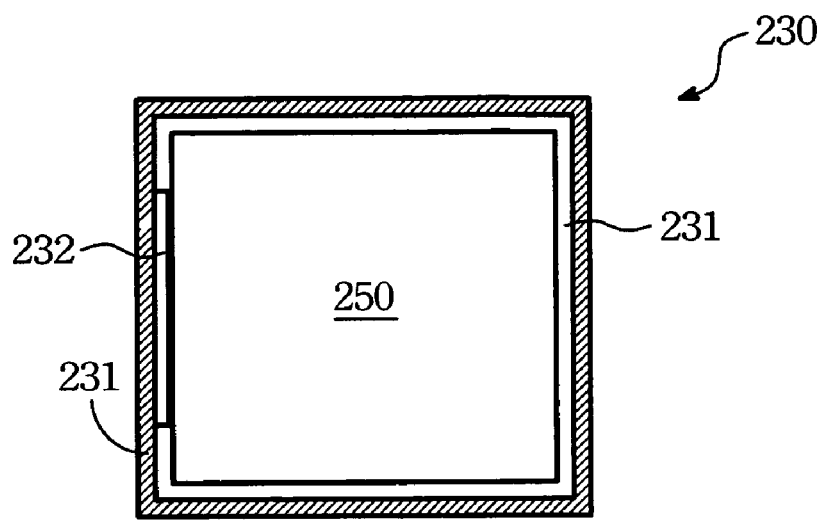
FIG. 8 is a top view showing another preferred embodiment of the invention.

Refer now to FIG. 8 for another embodiment of the lower housing 230. Compared with the embodiment as shown in FIG. 5, the shock absorber 232 is made in a long shape and formed in the middle portion of the side wall 231 to provide sufficient support for the LCD panel 250 and keep the LCD panel 250 in balance.

Figure 9:
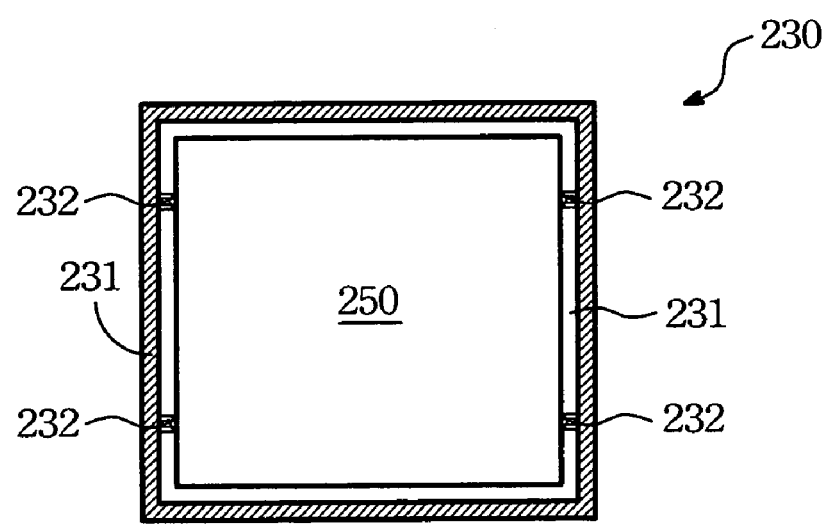
FIG. 9 is a top view showing another preferred embodiment of the invention.

Refer now to FIG. 9 for another embodiment of the invention. In this embodiment, each of two opposing side walls 231 of the lower housing 230 has two shock absorbers 232 respectively. When the LCD panel 250 is positioned in the lower housing 230, the shock absorbers 232 on the two opposing side walls 231 can help position the LCD panel 250 in the center. Moreover, the shock absorbers 232 can also prevent the LCD panel 250 from undesirable vibrations.

In the present invention, the upper housing 220 and the lower housing 230 can be made of plastic, metal, or any material the like.

Figure 1:
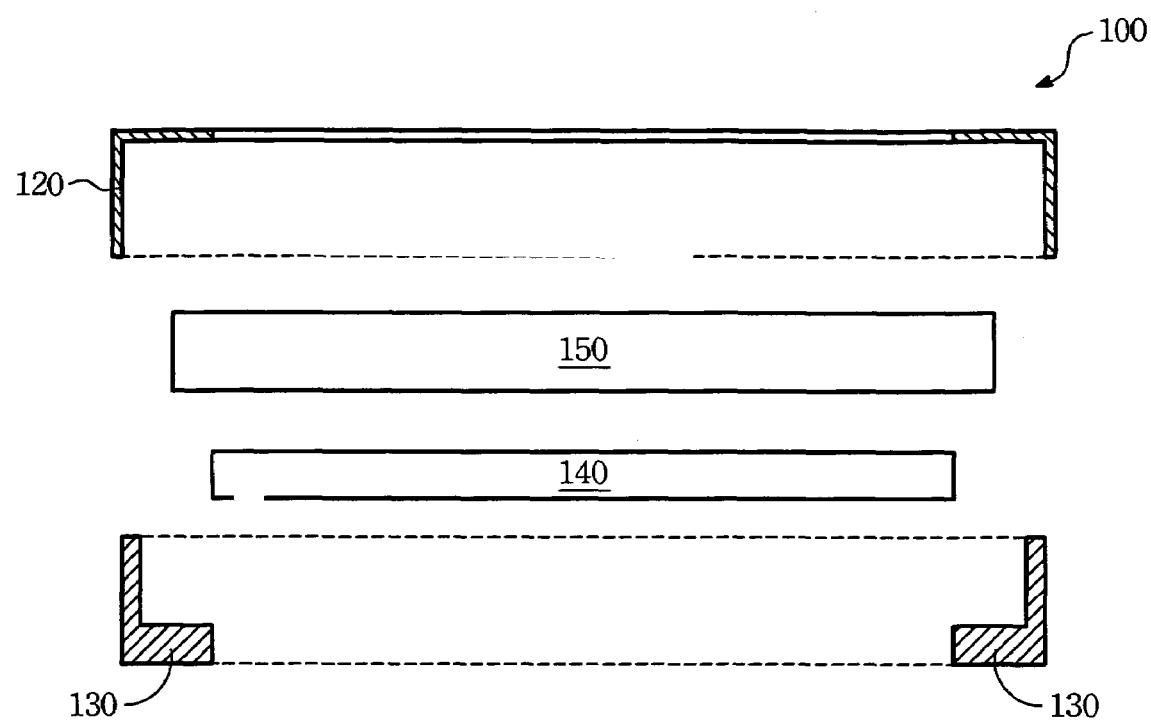
FIG. 1 is an exploded view of a conventional LCM.
Figure 2A:
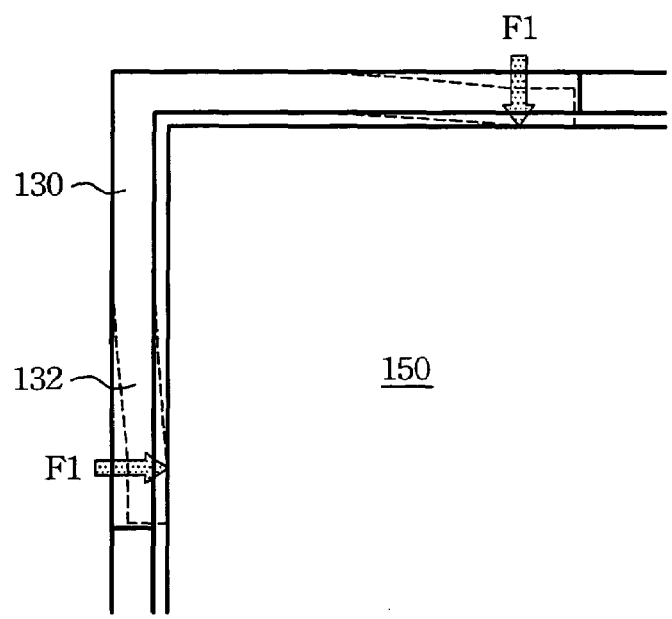
FIGS. 2A, 2B and 2C are schematic diagrams showing a portion of a housing structure of a conventional LCM.
Figure 2B:
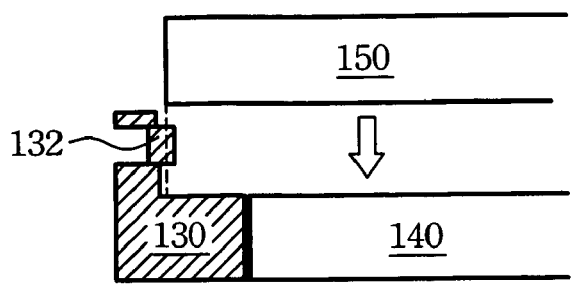
Figure 2C:
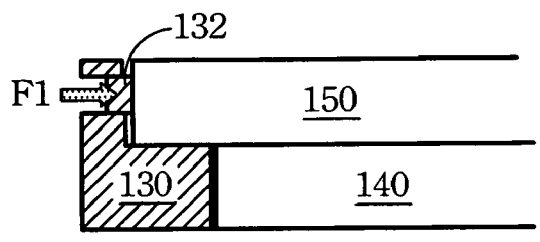

Compared with the conventional embodiments as shown in FIGS. 2 and 3, the invention has at least the following advantages:

1. In FIGS. 2 and 3, the conventional LCD panel 150 is highly possible to scrape the housing 130 during the assembly. Debris or particles generated by the accidental scraping might drop onto the backlight module 140 beneath the LCD panel 150 so as to cause possible product defects to the LCD module. On the other hand, the shock absorber 232 of the invention can smoothly anchor the LCD panel 250, without scrapping, into the lower housing 230 during the assembly, and thus no more accidental scraping in between can occur to generate debris or particles to further damage the backlight module 140.

2. Compared with the conventional assembly shown in FIGS. 2A through 2C where the leaf springs 132 provide torsion against the LCD panel 150, the shock absorber 232 of the invention can provide elastic, and thus preferable, bending to act against the LCD panel 250.

3. Compared also with the conventional assembly shown in FIGS. 2A through 2C where the leaf springs 132 can only buffer the horizontal vibration of the LCD panel 150, the shock absorber 232 of the invention can buffer bi-directional vibrations, horizontally and vertically, by providing the horizontal force fx and the vertical force fy concurrently.

Figure 3A:
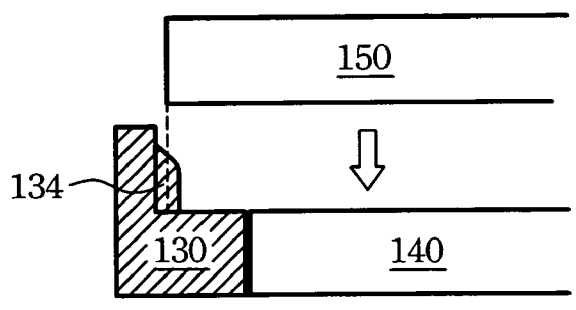
FIGS. 3A and 3B are schematic diagrams showing a portion of a housing structure of another conventional LCM.
Figure 3B:
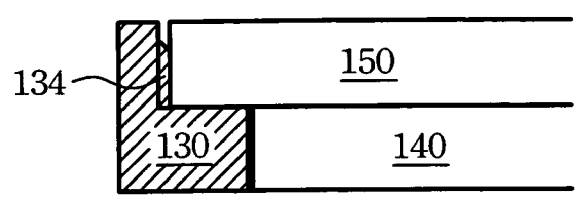

4. In FIGS. 3A and 3B, the protrusive rib 134 on the housing 130 is used to anchor the LCD panel 150 by squeezing in, hence the dimension of the housing 130 has to be precisely controlled for smoothly mounting of the LCD panel 150 in the assembly process. Instead, the shock absorber 232 of the invention utilizes its elastic deformation to hold the LCD panel 250, such that manufacturing of the lower housing 230 can have a wider tolerance range, and thus the mounting of the LCD panel 250 can be made much easier.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A housing for a liquid crystal display module, comprising:
   an upper housing;
   a lower housing configured with the upper housing, the lower housing having one-stage inner sidewalls creating a top room and a bottom room for enclosing a liquid crystal display panel stacked on a backlight module; and
   at least one shock absorber on a top surface of the one-stage inner sidewalls, the shock absorber having an inclined elastic protrusion with a free end for elastically supporting the liquid crystal display panel when the lower housing assembled with the upper housing.

2. The housing of claim 1, wherein said upper housing is made of plastic.

3. The housing of claim 1, wherein said lower housing is made of plastic.

4. The housing of claim 1, wherein said upper housing is made of metal.

5. The housing of claim 1, wherein said lower housing is made of metal.

6. The housing of claim 1, wherein said at least one shock absorber is formed with the lower housing as a unitary body.

7. A housing for a liquid crystal display module, comprising:
   an upper housing;
   a lower housing, configured with the upper housing, having one-stage inner sidewalls creating a top room and a bottom room for enclosing a liquid crystal display panel stacked on a backlight module; and
   at least one shock absorber, formed on a top surface of the one-stage inner sidewalls as a unitary body, having an inclined shock absorber with a free end for elastically supporting the liquid crystal display panel.

8. The housing of claim 7, wherein said upper housing is made of plastic.

9. The housing of claim 7, wherein said lower housing is made of plastic.

10. The housing of claim 7, wherein said upper housing is made of metal.

11. The housing of claim 7, wherein said lower housing is made of plastic.

* * * * *